United States Patent
Cha et al.

(10) Patent No.: US 12,444,537 B2
(45) Date of Patent: Oct. 14, 2025

(54) MULTILAYERED CAPACITOR AND MANUFACTURING METHOD THEREOF

(71) Applicant: SAMSUNG ELECTRO-MECHANICS CO., LTD., Suwon-si (KR)

(72) Inventors: Yun Jeong Cha, Suwon-si (KR); Eunji In, Suwon-si (KR); Yura Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 130 days.

(21) Appl. No.: 18/224,154

(22) Filed: Jul. 20, 2023

(65) Prior Publication Data
US 2024/0282523 A1 Aug. 22, 2024

(30) Foreign Application Priority Data
Feb. 16, 2023 (KR) .................. 10-2023-0020671

(51) Int. Cl.
*H01G 4/12* (2006.01)
*H01G 4/30* (2006.01)

(52) U.S. Cl.
CPC ............ *H01G 4/1227* (2013.01); *H01G 4/30* (2013.01)

(58) Field of Classification Search
CPC .............................. H01G 4/1227; H01G 4/30
See application file for complete search history.

(56) References Cited

U.S. PATENT DOCUMENTS

| | | | |
|---|---|---|---|
| 2001/0055193 A1* | 12/2001 | Chazono | H01G 4/1209 361/311 |
| 2008/0266751 A1* | 10/2008 | Yamazaki | C04B 35/62815 361/321.4 |
| 2011/0222205 A1* | 9/2011 | Muraki | C01G 23/006 361/321.5 |

(Continued)

FOREIGN PATENT DOCUMENTS

| | | |
|---|---|---|
| JP | 5121311 B2 | 1/2013 |
| JP | 2016-115876 A | 6/2016 |

(Continued)

OTHER PUBLICATIONS

Sang-Chae Jeon, et al. "Effects of core/shell volumetric ratio on the dielectric-temperature behavior of BaTiO3," Journal of Advanced Ceramics, 2014, vol. 3, No. 1, pp. 76-82.

(Continued)

*Primary Examiner* — Michael P McFadden
(74) *Attorney, Agent, or Firm* — Morgan Lewis & Bockius LLP (57) ABSTRACT

Provided are a multilayered capacitor and a manufacturing method thereof, the multilayered capacitor including a capacitor body including a dielectric layer and an internal electrode, and an external electrode outside the capacitor body, wherein the dielectric layer includes a plurality of dielectric grains, at least one of the plurality of dielectric grains has a core-shell structure, and in the dielectric grains having the core-shell structure, a ratio of a diameter of the core to a diameter of the dielectric grain having the core-shell structure is about 60% to about 80%.

20 Claims, 6 Drawing Sheets

(56) References Cited

U.S. PATENT DOCUMENTS

| | | | |
|---|---|---|---|
| 2012/0050941 A1* | 3/2012 | Murakawa | C04B 35/4682 |
| | | | 361/321.1 |
| 2013/0062578 A1 | 3/2013 | Park et al. | |
| 2014/0098455 A1* | 4/2014 | Kang | H01G 4/1227 |
| | | | 501/137 |
| 2016/0181019 A1* | 6/2016 | Park | H01G 4/12 |
| | | | 361/301.4 |
| 2019/0066920 A1* | 2/2019 | Kim | C04B 35/4682 |
| 2021/0151257 A1* | 5/2021 | Park | H01L 23/291 |
| 2021/0210288 A1* | 7/2021 | Kang | C04B 35/49 |

FOREIGN PATENT DOCUMENTS

| | | |
|---|---|---|
| KR | 10-2013-0027782 A | 3/2013 |
| KR | 10-2017-0135419 A | 12/2017 |

OTHER PUBLICATIONS

The Extended European Search Report dated Jan. 24, 2025 issued in European Patent Application No. 23186979.3.

\* cited by examiner

MULTILAYERED CAPACITOR AND MANUFACTURING METHOD THEREOF

CROSS-REFERENCE TO RELATED APPLICATION

This application claims priority to and the benefit of Korean Patent Application No. 10-2023-0020671 filed in the Korean Intellectual Property Office on Feb. 16, 2023, the entire contents of which are incorporated herein by reference.

TECHNICAL FIELD

A multilayered capacitor and a manufacturing method thereof are disclosed.

BACKGROUND OF ART

Recently, development of automotive electrical device parts has been rapidly progressing. A multilayered capacitor (MLCC), one of the electrical device parts, has an advantage of being small but capable of high capacity and thus is used as a part of various electronic products.

Performance of the multilayered capacitor is determined by a dielectric constant, voltage withstand characteristics, temperature characteristics, reliability, and the like. The multilayered capacitor has a dielectric layer formed by adding a predetermined amount of various types of additives to ceramic powder, and when the dielectric layer is based on a barium titanite, the performance of the multilayered ceramic capacitor may be improved by controlling a microstructure such as a dielectric grain size, a core size, a concentration of a shell, etc. or defect behaviors such as oxygen defects.

Regarding the microstructure control, when the dielectric grain size is increased, the dielectric constant may increase, but there are problems of deteriorating the voltage withstand characteristics and high temperature characteristics due to a grain ratio decrease and a shell ratio increase in the dielectric layer. In order to solve the problems, since the particle size has to inevitably be reduced, which may cause a side effect of decreasing the dielectric constant, in order to mitigate this side effect, research needs to be conducted toward maintaining the core size at a predetermined level, while still reducing the grain size.

In order to control the defect behaviors, a donner and an acceptor in an appropriate ratio are required to be dopped. The donner, based on barium titanite-based ceramics, may be mainly rare earth materials. The rare earth doping has a very large effect on characteristic changes of the barium titanite-based ceramics and in particular, brings about various effects such as improving a voltage withstand characteristic, a dielectric constant when a DC voltage is applied, temperature stability, and the like. Accordingly, technology of controlling a core/shell ratio and a concentration in the dielectric layer may mainly serve to improve performance of a ceramic capacitor.

Conventional efforts of increasing the dielectric constant of the dielectric layer have been made by proposing a method of using a parent material with a large grain size in order to increase a core fraction in a dielectric grain with a core-shell structure or by researching on increasing the grain size, as firing time increases, which leads to decreasing the core fraction. However, as MLCC is gradually smaller and thinner, since development of dielectric grains also are being made toward getting smaller, there are limitations in using the parent material with a large grain size or adjusting the firing time.

SUMMARY OF THE INVENTION

Performance of multilayered capacitors, such as a dielectric constant, a voltage withstand characteristic, a dielectric constant under DC voltage application, and temperature stability may be improved by controlling a core-shell fraction of dielectric grains.

A multilayered capacitor according to one aspect includes a capacitor body including a dielectric layer and an internal electrode, and an external electrode disposed on an outer surface of the capacitor body, wherein the dielectric layer includes a plurality of dielectric grains, at least one of the plurality of dielectric grains has a core-shell structure, and in the dielectric grains having the core-shell structure, a ratio between diameters of the core to the dielectric grain is about 60% to about 80%.

The ratio of a diameter of the core of the core-shell structure to a diameter of the dielectric grain having the core-shell structure may be about 60% to about 76%, or about 70% to about 80%, or about 74.5% to about 80%.

A diameter of the dielectric grains having the core-shell structure may be about 300 nm to about 500 nm, and a diameter of the core may be about 200 nm to about 400 nm.

A standard deviation of an average thickness of the shell may be less than or equal to about 10% relative to the diameter of the dielectric grains of the core-shell structure.

The dielectric grains may include a main component comprising a barium titanate-based compound and a subcomponent comprising manganese (Mn), chromium (Cr), silicon (Si), aluminum (Al), magnesium (Mg), tin (Sn), antimony (Sb), germanium (Ge), gallium (Ga), indium (In), or combinations thereof.

In the dielectric grains of the core-shell structure, the shell may include the subcomponent in an amount of greater than about 0.1 moles and less than or equal to about 30.0 moles relative to 100 moles of the main component, and the core may include the subcomponent in an amount of less than or equal to about 0.1 moles relative to 100 moles of the main component.

For example, the main component may include $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, or a combination thereof. Specifically, the main component may include $Ba_mTiO_3$ ($0.995 \leq m \leq 1.01$), $(Ba_{1-x}Ca_x)_m(Ti_{1-y}Zr_y)O_3$ ($0.995 \leq m \leq 1.01$, $0 \leq x \leq 0.10$, $0 < y \leq 0.2$), $Ba_m(Ti_{1-x}Zr_x)O_3$ ($0.995 \leq m \leq 1.010$, $0 \leq x \leq 0.10$), $(Ba_{1-x}Ca_x)_m(Ti_{1-y}Sn_y)O_3$ ($0.995 \leq m \leq 1.01$, $0 \leq x \leq 0.1$, $0 < y \leq 0.2$), or a combination thereof.

The subcomponent may further include lanthanum (La), yttrium (Y), actinide (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V), or combinations thereof.

The dielectric grains may include, for example, about 0.1 parts by mole to about 1.0 part by mole of $Dy_2O_3$, about 0.1 parts by mole to about 1.0 part by mole of $Tb_2O_3$, about 0 parts by mole (or more than 0 parts by mole) to about 0.2 parts by mole of $MnO_2$, about 0 parts by mole (or more than 0 parts by mole) to about 0.15 parts by mole of $V_2O_5$, about 1.5 parts by mole to about 3.3 parts by mole of $BaCO_3$, about 0.5 parts by mole to about 4.0 parts by mole of $SiO_2$, about 0.4 parts by mole to about 0.6 parts by mole of $Al_2O_3$, and about 0 parts by mole (or more than 0 parts by mole) to about 0.8 parts by mole of $CaCO_3$ as a subcomponent relative to 100 parts by mole of the main component.

An average thickness of the dielectric layer may be about 0.2 μm to about 10 μm.

A method of manufacturing a multilayered capacitor according to one aspect includes mixing a ceramic powder and a liquid metal oxide additive to prepare a dielectric paste including dielectric grains of the core-shell structure, manufacturing a dielectric green sheet using the dielectric paste, and forming a conductive paste layer on a surface of the dielectric green sheet, stacking the dielectric green sheet with the conductive paste layer to manufacture a dielectric green sheet stack, firing the dielectric green sheet stack to manufacture a capacitor body, and forming an external electrode on a first surface of the capacitor body. Herein, in the preparing of the dielectric paste, the liquid metal oxide additive is added in an amount of about 0.05 parts by mole to about 4.5 parts by mole based on 100 parts by mole of the ceramic powder.

The liquid metal oxide additive may include an acidic solvent and an ionic metal oxide, and optionally an ionic surfactant.

The ceramic powder may include barium titanate, and the metal oxide may include manganese (Mn), chromium (Cr), silicon (Si), aluminum (Al), magnesium (Mg), tin (Sn), antimony (Sb), germanium (Ge), gallium (Ga), indium (In), or a combination thereof.

The multilayered capacitor has improved performance such as a dielectric constant, a voltage withstand characteristic, a dielectric constant under DC voltage application, temperature stability, and the like.

DETAILED DESCRIPTION OF THE EMBODIMENTS

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the embodiments disclosed in the present specification, and it is to be understood that the present disclosure includes all modifications, equivalents, and substitutions without departing from the scope and embodiments of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 20% of the numerical value of the number with which it is being used. Therefore, about 50% means in the range of 45%-55%. Numerical ranges recited herein by endpoints include all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about."

Figure 1:
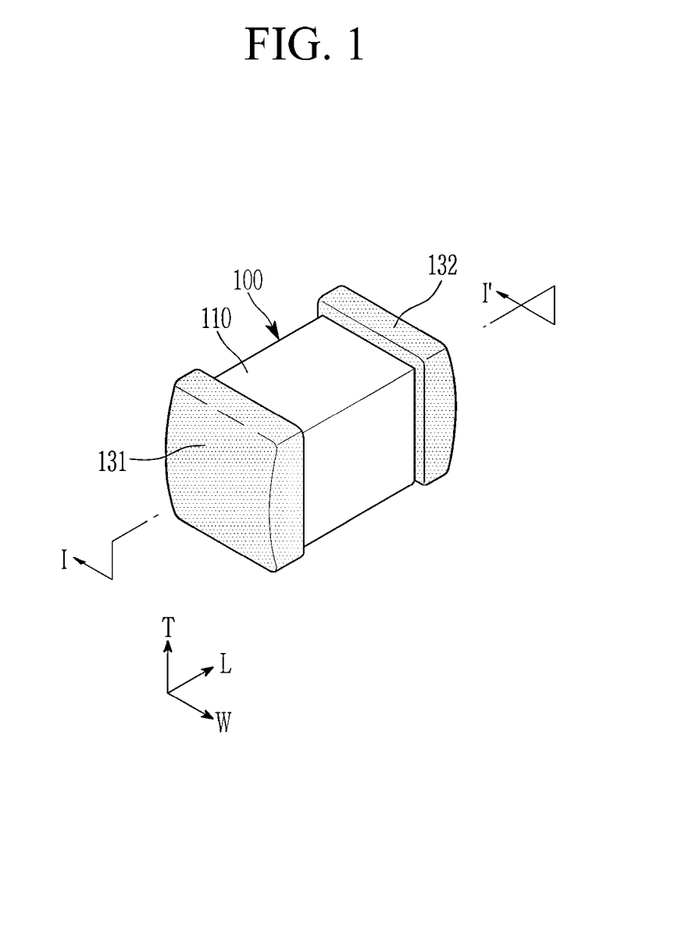
FIG. 1 is a perspective view of a multilayered capacitor according to an embodiment.
Figure 2:
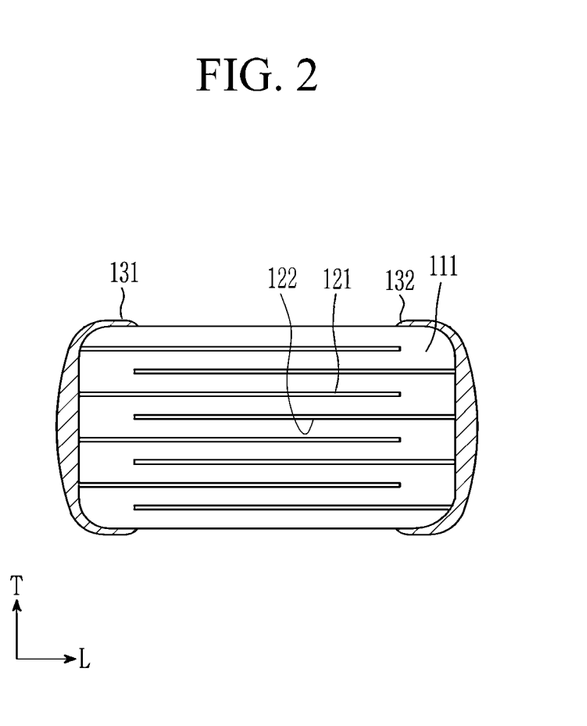
FIG. 2 is a cross-sectional view of a multilayered capacitor cut along line I-I' of FIG. 1.
Figure 3:
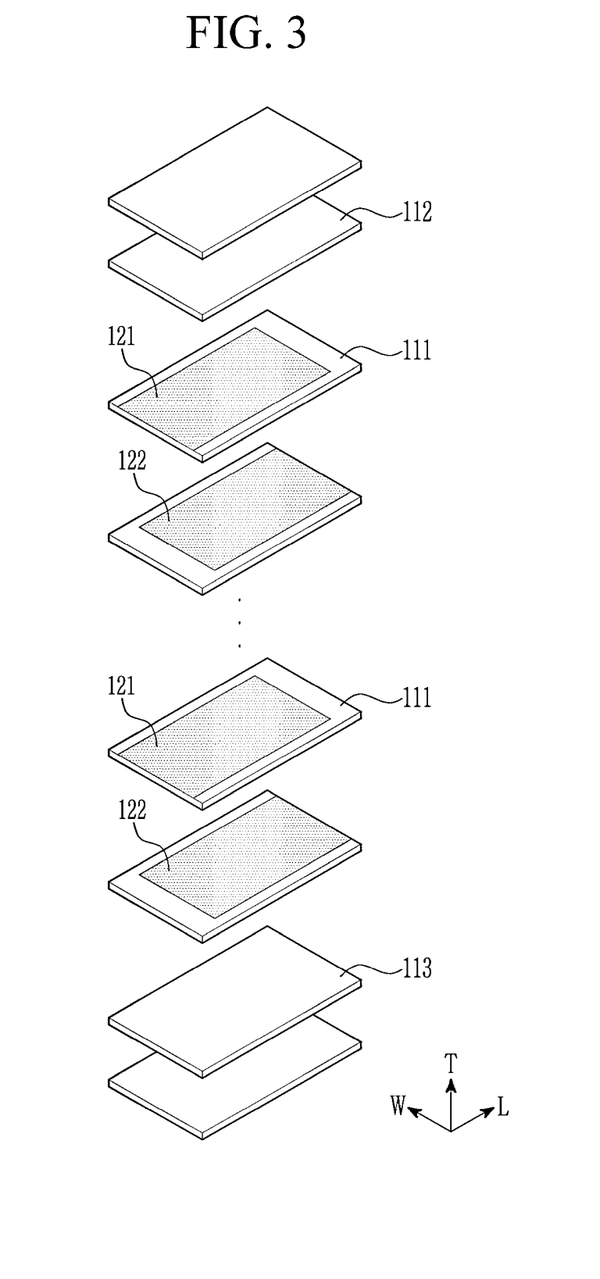
FIG. 3 is an exploded perspective view showing a stacked structure of the internal electrode layers in the capacitor body of FIG. 1.

FIG. 1 is a perspective view illustrating a multilayered capacitor 100 according to an embodiment, FIG. 2 is a cross-sectional view of the multilayered capacitor 100 taken along line I-I' of FIG. 1, and FIG. 3 is an exploded perspective view illustrating a stacked structure of internal electrode layers in the capacitor body 110 of FIG. 1.

When directions are defined to clearly describe the present embodiment, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Referring to FIGS. 1 to 3, the multilayered capacitor 100 according to the present embodiment may include the capacitor body 110, and first and second external electrodes 131 and 132 disposed on both end surfaces of the capacitor body 110 which face each other in the longitudinal direction (L-axis direction).

The capacitor body 110 may have, for example, a substantially hexahedral shape.

In this embodiment, for convenience of explanation, in the capacitor body 110, surfaces opposite to each other in the thickness direction (T-axis direction) are defined as first and second surfaces, surfaces connected to the first and second surfaces and facing each other in the longitudinal direction (L-axis direction) are defined as third and fourth surfaces, and surfaces connected to the first and second surfaces, connected to the third and fourth surfaces, and facing each other in the width direction (W-axis direction) are defined as fifth and sixth surfaces.

For example, the first surface, which is a lower surface, may be a surface facing the mounting direction of the multilayered capacitor 100. In addition, the first to sixth surfaces may be flat, but the present disclosure is not limited thereto, for example, the first to sixth surfaces may be curved surfaces with a convex central portion, and an edge of each surface which is a boundary, may be round.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the thickness direction (T-axis direction) and then firing them, and includes a plurality of dielectric layers 111, and first and second internal electrode layers 121 and 122 which are alternately disposed in a thickness direction (T-axis direction) with the dielectric layers 111 interposed therebetween.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating a capacitance of the multilayered capacitor 100. For example, the active region may be a region in which the first and second internal electrode layers 121 and 122 are stacked and overlapped with each other along the thickness direction (T-axis direction).

The cover regions 112 and 113 may be respectively disposed on the first and second surfaces of the active region in the thickness direction (T-axis direction) as thickness-direction margin portions. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a width-direction margin portion, and may be respectively disposed on the fifth and sixth surfaces of the active region in the width direction (W-axis direction). Such side cover regions may be formed by coating a conductive paste layer for forming internal electrode layers on the surface of the dielectric green sheet only on a portion of the surface of the dielectric green sheet, stacking dielectric green sheets on which a conductive paste layer is not coated on both side surfaces of the dielectric green sheet, and firing the same.

The cover regions 112 and 113 and the side cover regions serve to prevent damage to the first and second internal electrode layers 121 and 122 due to physical or chemical stress.

Hereinafter, the dielectric layer 111 is described in detail.

Figure 4:
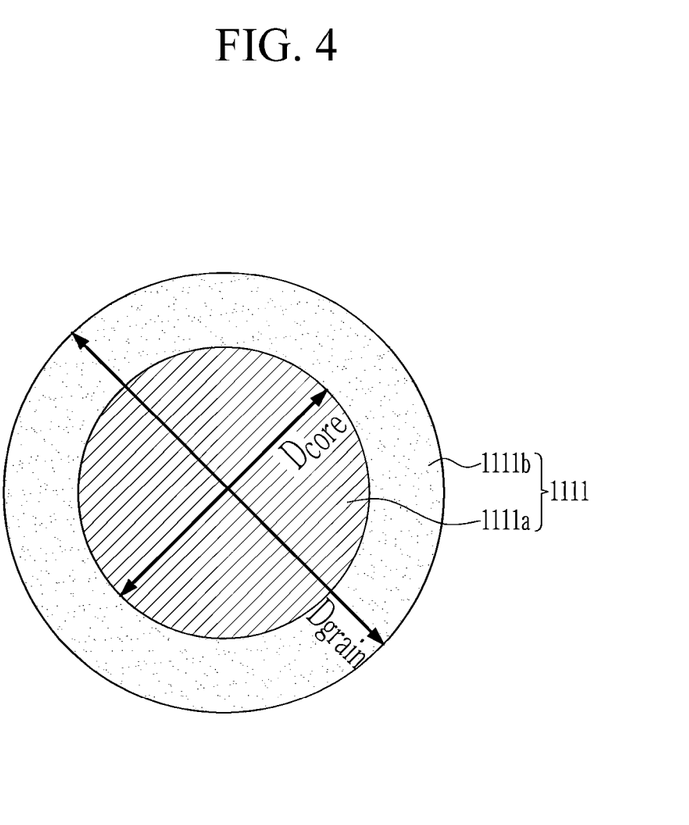
FIG. 4 is a view of a dielectric grain of the core-shell structure, showing a diameter of the dielectric grain ($D_{grain}$) and a diameter of the core ($D_{core}$).

The dielectric layer 111 include a plurality of dielectric grains 1111. The dielectric grain 1111 includes a main component and a subcomponent.

The main component may be a dielectric material including a barium titanite-based compound. Specifically, the main component may be a dielectric material including $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, or a combination thereof. For example, the main component may include $Ba_mTiO_3$ ($0.995 \leq m \leq 1.01$), $(Ba_{1-x}Ca_x)_m(Ti_{1-y}Zr_y)O_3$ ($0.995 \leq m \leq 1.01$, $0 \leq x \leq 0.1$, $0 < y \leq 0.2$), $Ba_m(Ti_{1-x}Zr_x)O_3$ ($0.995 \leq m \leq 1.01$, $x \leq 0.1$), $(Ba_{1-x}Ca_x)_m(Ti_{1-y}Sn_y)O_3$ ($0.995 \leq m \leq 1.01$, $0 \leq x \leq 0.1$, $0 < y \leq 0.2$), or combinations thereof.

The subcomponent may include hafnium (Hf), manganese (Mn), chromium (Cr), silicon (Si), aluminum (Al), magnesium (Mg), tin (Sn), antimony (Sb), germanium (Ge), gallium (Ga), indium (In), or a combination thereof. In addition, the subcomponent may further include lanthanum (La), yttrium (Y), actinide (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V), or combinations thereof.

For example, the subcomponent may include about 0.1 parts by mole to about 1.0 part by mole of $Dy_2O_3$, about 0.1 parts by mole to about 1.0 part by mole of $Tb_2O_3$, about 0 parts by mole to about 0.2 parts by mole of $MnO_2$, about 0 parts by mole to about 0.15 parts by mole of $V_2O_5$, about 1.5 parts by mole to about 3.3 parts by mole of $BaCO_3$, about 0.5 parts by mole to about 4.0 parts by mole of $SiO_2$, about 0.4 parts by mole to about 0.6 parts by mole of $Al_2O_3$, and about 0 parts by mole to about 0.8 parts by mole of $CaCO_3$ relative to 100 parts by mole of the main component.

At least one of the plurality of dielectric grains 1111 has a core-shell structure. FIG. 4 exhibits the dielectric grain with the core-shell structure. Referring to FIG. 4, the dielectric grain 1111 with the core-shell structure includes a dielectric material core 1111a and a shell 1111b surrounding at least a portion of the core 1111a within one dielectric grain 1111.

The core 1111a and the shell 1111b have a different molar ratio of a subcomponent to a main component, for example, the molar ratio of the subcomponent to the main component may sharply change at the boundary between the core 1111a and the shell 1111b. Accordingly, the boundary between the core 1111a and the shell 1111b may be easily distinguished, which may be determined through transmission electron microscope-energy dispersive X-ray analysis (TEM-EDX).

For example, on the cross-section of the capacitor body 110 cut at the center of the W-axis direction in the L-axis direction and the T-axis direction, when an energy disperse X-ray spectrometer (EDS) installed in a transmission electron microscope (TEM) is used to perform a line analysis of the dielectric grain 1111 of the dielectric layer 111 located at the center of an active region, the core 1111a and the shell 1111b may be distinguished by the boundary of the core 1111a and the shell 1111b where a total content of the subcomponent starts to sharply increase from the center of the core 1111a of the dielectric grain 1111 toward any boundary direction of the dielectric grain 1111.

Herein, the center of the core 1111a may be determined as a point where the largest major axis of the core 1111a meets the largest minor axis among minor axes perpendicular thereto. In addition, the EDS (energy disperse X-ray spectrometer) line analysis may be performed along the major axis passing through the center of the core 1111a of the dielectric grain 1111. Alternatively, the boundary between the shell (S) and the grain boundary (GB) may be defined by dividing portions with a different contrast in a method binarizing the transmission electron microscope image and the like.

For example, the core 1111a may include less than or equal to about 0.1 parts by mole of the subcomponent based on about 100 parts by mole of the main component, and the shell 1111b may include greater than about 0.1 parts by mole and less than or equal to about 30.0 (or about 30) parts by mole or greater than about 0.1 parts by mole and less than or equal to about 20.0 parts by mole (or about 20 parts by mole) of the subcomponent based on about 100 parts by mole of the main component. In some embodiments, the shell 1111b may include greater than about 0.1, 0.2, 0.3, 0.4, 0.5, 0.6, 0.7, 0.8, 0.9 or 1 parts by mole and less than or equal to about 30, 29, 28, 27, 26, 25, 24, 23, 22, 21, 20 parts by mole of the subcomponent based on about 100 parts by mole of the main component. When the core 1111a includes greater than about 0.1 parts by mole of the subcomponent based on about 100 parts by mole of the main component, material characteristics of a pure dielectric material (i.e., $BaTiO_3$) may be changed, and when the shell 1111b includes less than or equal to about 0.1 parts by mole of the subcomponent based on about 100 parts by mole of the main component, a dielectric constant according to a temperature may greatly be changed, and when greater than about 30.0 parts by mole of the subcomponent is included, initial insulation resistance may be lowered. In some embodiments, the shell 1111b may include greater than about 0.1 parts by mole and less than or equal to about 4.5 parts by mole of the subcomponent based on about 100 parts by mole of the main component. In some embodiments, the shell 1111b may include greater than about 0.1, 0.2, 0.3, 0.4, 0.5, 0.6, 0.7, 0.8, 0.9 or 1 parts by mole and less than or equal to about 4.5, 4.4, 4.3, 4.2, 4.1, 4, 3.9, 3.8, 3.7, 3.6, 3.5 parts by mole of the subcomponent based on about 100 parts by mole of the main component.

In other words, in the core 1111a, the subcomponent may not be present or if any, included in a very small amount. Accordingly, the core 1111a may include a pure main component alone without impurities, wherein the pure main component may in general have a high dielectric constant, compared with a main component doped with impurity elements. Accordingly, the core 1111a plays a role of maintaining a dielectric constant.

An amount of the subcomponent(s) included in the shell 1111b may be more than the amount of the subcomponent(s) included in the core 1111a. In the shell 1111b, the subcomponent doped at a B-site of the main component (perovskite $ABO_3$ structure) may have an effect of increasing band gap energy in which other rare earth elements and doping elements diffuse into the dielectric grain 1111. Accordingly, the subcomponent may serve as a barrier to suppress the diffusion of the other rare earth elements and the doping elements into the dielectric grains 1111. The shell 1111b may serve to suppress growth of the dielectric grain 1111, thereby contributing to atomization of the dielectric grain 1111. In addition, in the shell 1111b, the subcomponent doped onto an A-site of the main component may serve to improve reliability and a dielectric constant.

In this embodiment, a diameter of the core is about 60% to about 80% of a diameter of the dielectric grain with the core-shell structure. Referring to FIG. 4, when the diameter of the dielectric grain is defined as $D_{grain}$, the diameter of the core is defined as $D_{core}$, a ratio thereof is calculated according to calculation equation ($D_{core}/D_{grain} \times 100$), which may be expressed as a core fraction, a core length fraction, or the like.

The diameter of the dielectric grain with the core-shell structure and the diameter of the core may be obtained by randomly selecting about 50 grains from an image of the dielectric layer taken with a scanning electron microscope to measure the diameters of the grains and the diameter of the cores and then calculate their arithmetic averages. For example, a cross-section of a main-fired MLCC chip is exposed to take a photograph of three layers of an active center of an active region with SEM and then from the 70K magnification image, each diameter of 50 grains and 50 cores therein are measured and an arithmetic mean is calculated. The SEM analysis is performed by setting an acceleration voltage at about 2.0 KV and WD at about 3.2 mm. The diameters may be calculated as an average of a max feret diameter and an orthogonal feret diameter. The diameter of the dielectric grain, the diameter of the core, etc. may be expressed as an average diameter.

The present embodiment has used a liquid metal oxide additive rather than an oxide additive during manufacturing of the dielectric grain to induce the elements to be uniformly distributed around the core without forming agglomerates and also secured an optimal core fraction through sintering after changing a content of the liquid metal oxide additive alone, while maintaining the same composition of the liquid metal oxide additive. When the content of the liquid metal oxide additive serving as a type of the subcomponent or a dopant is reduced at a predetermined rate, while keeping compositions of the raw materials and conditions such as a firing temperature and the like the same, the core length fraction in the dielectric grain may be dramatically increased.

In the present embodiment, the aforementioned core fraction may be about 60% to about 80%, for example about 60% to about 76%, or about 70% to about 80%, or about 74.5% to about 80%. When the core fraction, that is, the ratio of the diameter of the core to that of the dielectric grain satisfies the ranges, overall performance of the multilayered capacitor such as voltage withstand characteristics, a dielectric constant, DC characteristics, temperature stability, and the like may be improved.

A diameter of the dielectric grains of the core-shell structure may be about 100 nm to about 1,000 nm, and specifically about 300 nm to about 500 nm, or about 340 nm to about 440 nm. Additionally, the diameter of the core 1111a may be about 50 nm to about 500 nm, and more specifically about 200 nm to about 400 nm, or about 240 nm to about 340 nm. In this case, capacity characteristics and reliability of the multilayered capacitor may be improved.

The dielectric grains of the core-shell structure according to the present embodiment is characterized in that the thickness of the shell 1111b is constant, i.e., a deviation of the shell thickness is small, since it is manufactured using a liquid metal oxide additive. For example, a standard deviation of an average thickness of the shell 1111b may be less than or equal to about 10%, or less than or equal to about 5% relative to the diameter of the dielectric grains of the core-shell structure. In this case, voltage withstand characteristics of the multilayered capacitor may be greatly improved.

For example, an average thickness of the dielectric layer 111 may be about 0.2 µm to about 10 µm, or about 0.4 µm to about 1 µm.

On the other hand, the first and second internal electrodes 121 and 122 are electrodes having different polarities, and are alternately disposed to face each other along the T-axis direction with the dielectric layer 111 interposed therebetween, and one end thereof may be exposed through the third and fourth surfaces of the capacitor body 110.

The first and second internal electrodes 121 and 122 may be electrically insulated from each other by the dielectric layer 111 disposed in the middle.

Ends of the first and second internal electrodes 121 and 122 alternately exposed through the third and fourth surfaces of the capacitor body 110 are connected to the first and second external electrodes 131 and 132, respectively, to be electrically connected.

The first and second internal electrode layers 121 and 122 may include a conductive metal, for example, a metal such as Ni, Cu, Ag, Pd, or Au, and the like, an alloy thereof, for example an Ag—Pd alloy.

Also, the first and second internal electrode layers 121 and 122 may include dielectric particles having the same composition as the ceramic material included in the dielectric layer 111.

The first and second internal electrode layers 121 and 122 may be formed using a conductive paste containing a conductive metal. As a method of printing the conductive paste, a screen-printing method or a gravure printing method or the like may be used.

For example, each average thickness of the first and second internal electrode layers 121 and 122 may be about 0.1 µm to about 2 µm.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping each other along the T-axis direction in the active region.

The first and second external electrodes 131 and 132 may respectively include a first connection portion and a second connection portion disposed on the third and fourth surfaces of the capacitor body 110 and connected to the first and second internal electrodes 121 and 122, and may also include a first band portion and a second band portion disposed at each corner where the third and fourth surface and the first and second surfaces or the fifth and sixth surfaces of the capacitor body 110 meet.

The first and second band portions may extend from the first and second connection portions to portions of the first and second surfaces or the fifth and sixth surfaces of the capacitor body 110, respectively. The first and second band portions may serve to improve adhesion strength of the first and second external electrodes 131 and 132.

For example, the first and second external electrodes 131 and 132 may each include a sintered metal layer in contact with the capacitor body 110, a conductive resin layer configured to cover the sintered metal layer, and a plating layer configured to cover the conductive resin layer.

The sintered metal layer may include a conductive metal and glass.

For example, the sintered metal layer may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, as a conductive metal, and for example the copper (Cu) may include a copper (Cu) alloy. When the conductive metal includes copper, a metal other than copper may be included in an amount of less than or equal to about 5 parts by mole based on 100 parts by mole of copper.

For example, the sintered metal layer may include a composition of oxides as a glass, for example, one or more selected from a silicon oxide, a boron oxide, an aluminum oxide, a transition metal oxide, an alkali metal oxide, and an alkaline earth metal oxide. The transition metal may be selected from zinc (Zn), titanium (Ti), copper (Cu), vanadium (V), manganese (Mn), iron (Fe), and nickel (Ni); the alkali metal may be selected from lithium (Li), sodium (Na), and potassium (K); and the alkaline-earth metal may be selected from magnesium (Mg), calcium (Ca), strontium (Sr), and barium (Ba).

Contents of the conductive metal and glass in the sintered metal layer are not particularly limited, but for example, an average area of the conductive metal in a cross section perpendicular to the thickness direction (W-axis direction) of the multilayered capacitor 100 (L-axis and T-axis direction sections) may be about 30% to about 90%, or about 70% to about 90%, of the total area of the sintered metal layer.

Optionally, the conductive resin layer may include the sintered metal layer, for example, completely covering the sintered metal layer. On the other hand, the first and second external electrodes 131 and 132 may not include a sintered metal layer, in which case the conductive resin layer may be in direct contact with the capacitor body 110.

The conductive resin layer extends to the first and second surfaces or the fifth and sixth surfaces of the capacitor body 110, wherein a region (i.e., a band portion) where the conductive resin layer extends to the first and second surfaces or the fifth and sixth surfaces of the capacitor body 110 may have a longer length than a region (i.e., band portion) where the sintered metal layer extends the first and second surfaces or the fifth and sixth surfaces of the capacitor body 110. In other words, the conductive resin layer is formed on the sintered metal layer, while fully covering the sintered metal layer.

The conductive resin layer may include a resin and a conductive metal.

The resin included in the conductive resin layer is not particularly limited as long as it has bondability and impact absorption properties and can be mixed with the conductive metal powder to form a paste, and may include, for example, a phenolic resin, an acrylic resin, a silicone resin, an epoxy resin, or a polyimide resin.

The conductive metal included in the conductive resin layer may serve to electrically connect the first and second internal electrodes 121 and 122 or the sintered metal layer.

The conductive metal included in the conductive resin layer may have a spherical shape, a flake shape, or a combination thereof. That is, the conductive metal may be formed only in a flake shape, only in a spherical shape, or may have a mixed shape of a flake shape and a spherical shape.

Herein, the spherical shape may also include a shape that is not perfectly spherical, and may include a shape in which, for example, a length ratio between a major axis and a minor axis (long axis/short axis) is less than or equal to about 1.45. The flake-shaped powder means a powder having a flat and elongated shape, and is not particularly limited, but, for example, a length ratio between a major axis and a minor axis (long axis/short axis) may be greater than or equal to about 1.95.

The first and second external electrodes 131 and 132 may further include a plating layer outside the conductive resin layer.

The plating layer may include nickel (Ni), copper (Cu), tin (Sn), palladium (Pd), platinum (Pt), gold (Au), silver (Ag), tungsten (W), titanium (Ti), or lead (Pb), alone or an alloy thereof. For example, the plating layer may be a nickel (Ni) plating layer or a tin (Sn) plating layer, and may have a form in which a nickel (Ni) plating layer and a tin (Sn) plating layer are sequentially stacked or a tin (Sn) plating layer, a nickel (Ni) plating layer, and a tin (Sn) plating layer are sequentially stacked. In addition, the plating layer may include a plurality of nickel (Ni) plating layers and/or a plurality of tin (Sn) plating layers.

The plating layer may improve mountability of the multilayered capacitor 100 with a board, structural reliability, external durability, heat resistance, and equivalent series resistance (ESR).

A method of manufacturing a multilayered capacitor according to an aspect includes mixing a ceramic powder and a liquid metal oxide additive to prepare a dielectric paste including dielectric grains of the core-shell structure, manufacturing a dielectric green sheet using the dielectric paste, forming a conductive paste layer on a surface of the dielectric green sheet, stacking the dielectric green sheet with the conductive paste layer to manufacture a dielectric green sheet stack, firing the dielectric green sheet stack to manufacture a capacitor body, and forming an external electrode on a first surface of the capacitor body. Herein, in the preparing of the dielectric paste, the liquid metal oxide additive is added in an amount of about 0.05 parts by mole to about 4.5 parts by mole based on 100 parts by mole of the ceramic powder.

Herein, the ceramic powder may include a barium titanite-based compound, and specifically, $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, or combinations thereof. For example, the ceramic powder may include $Ba_mTiO_3$ (0.995≤m≤1.01), $(Ba_{1-x}Ca_x)_m(Ti_{1-y}Zr_y)O_3$, (0.995≤m≤1.01, 0≤x≤0.1, 0<y≤0.2), $Ba_m(Ti_{1-x}Zr_x)O_3$ (0.995≤m≤1.01, x≤0.1), $(Ba_{1-x}Ca_x)_m(Ti_{1-y}Sn_y)O_3$ (0.995≤m≤1.101, 0≤x≤0.1, 0<y≤0.2), or a combination thereof.

The liquid metal oxide additive may be a type of sub-component raw material or dopant raw material. The liquid metal oxide additive may be prepared by adding metal oxide powder to an acidic solvent, so that the metal oxide may exist in an ionized state in the additive. In other words, the liquid metal oxide additive may include the acidic solvent and ionic metal oxide or may include an organic salt of the metal oxide. The organic salt of the metal oxide may be a resulting material of an ion reaction between the ionic metal oxide and an ionic surfactant. The acidic solvent may include, for example, hydrochloric acid, nitric acid, oxalic acid, hydrogen peroxide, or a combination thereof but is not limited thereto. The metal oxide, the ionic metal oxide and the organic salt of the metal oxide may include manganese (Mn), chromium (Cr), silicon (Si), aluminum (Al), magnesium (Mg), tin (Sn), antimony (Sb), germanium (Ge), gallium (Ga), indium (In), or a combination thereof as a metal element, and may further include lanthanum (La), yttrium (Y), actinide (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V), or a combination thereof.

For example, the metal oxide may include about 0.1 parts by mole to about 1.0 part by mole of $Dy_2O_3$, about 0.1 parts by mole to about 1.0 part by mole of $Tb_2O_3$, about 0 parts by mole to about 0.2 parts by mole of $MnO_2$, about 0 parts by mole to about 0.15 parts by mole of $V_2O_5$, about 1.5 parts by mole to about 3.3 parts by mole of $BaCO_3$, about 0.5 parts by mole to about 4.0 parts by mole of $SiO_2$, about 0.4 parts by mole to about 0.6 parts by mole of $Al_2O_3$, and/or about 0 parts by mole to about 0.8 parts by mole of $CaCO_3$ based on 100 parts by mole of the ceramic powder.

A conventional technology of using a particle-type oxide additive may hardly realize intended characteristics of a capacitor due to deteriorated dispersibility of the additive and deteriorated thickness uniformity of a shell according to aggregation of the additive. On the contrary, when the liquid metal oxide according to an embodiment is used as an additive, the dispersibility may be improved without separately using a dispersant, and the added elements are uniformly dispersed around the core without forming agglomerates, manufacturing dielectric grains with excellent quality and resultantly, improving overall performance of a multilayered capacitor such as voltage withstand characteristics and the like In this embodiment, the content of the additive may be changed, while maintaining the same composition of the additive and then sintered to control the core-shell fraction in the dielectric grain. In order to secure a uniform thickness of the shell according to a content of the additive, since the added elements may not be formed into agglomerates but uniformly dispersed around the core, the liquid metal oxide additive should be used.

Since the dielectric grains have a core-shell structure, and a dielectric constant and voltage withstand characteristics, DC characteristics, a temperature coefficient of capacitance (TCC) greatly vary depending on a core-shell ratio thereof, it is important to realize an appropriate core-shell ratio. The embodiment has succeeded in reducing a shell ratio but increasing a relative core ratio by maintaining each element in the same ratio in the liquid metal oxide additive but changing a content of the liquid metal oxide additive alone in and also, maintaining the same firing condition. For example, when the content of the liquid metal oxide additive with the same composition is reduced from about 100% to about 62.5%, the core fraction may increase from about 55% to about 76%, and this method may control the core fraction within a range of about 60% to about 80%. For example, the content of the liquid metal oxide additive may be reduced to less than or equal to about 90%, for example less than or equal to about 80%, or less than or equal to about 70%, or about 60% to about 90% to increase the core fraction, which is the ratio of the core diameter to the grain diameter, wherein the core fraction is controlled to about 60% to about 80%, all improving a dielectric constant, voltage withstand characteristics, DC characteristics, TCC characteristics of the multilayered capacitor.

For example, in the preparing of the dielectric paste, the liquid metal oxide additive may be added in an amount of about 0.05 parts by mole to about 4.5 parts by mole, for example 0.1 parts by mole to 4.0 parts by mole, or 1.0 part by mole to 3.5 parts by mole based on 100 parts by mole of the ceramic powder. Herein, the core fraction may be controlled to about 60% to about 80%, which may improve a dielectric constant, voltage withstand characteristics, DC characteristics, and TCC characteristics of the multilayered capacitor.

When the ceramic powder is mixed with the liquid metal oxide additive, a solvent, a plasticizer, a binder, and the like may be mixed together. After the mixing, the mixture may be filtered, condensed, or dried, preparing a dielectric paste.

A dielectric green sheet is obtained by forming the obtained dielectric paste into a sheet by a doctor blade method or the like. In addition, the dielectric paste may include an additive selected from various dispersants, plasticizers, dielectrics, subcomponent compounds, or glass as needed.

The conductive paste include the composition that becomes the internal electrode after firing. Conductive paste for the internal electrode may be prepared by kneading conductive powder made of a conductive metal or an alloy thereof with a binder or a solvent. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for an internal electrode is applied in a predetermined pattern by various printing methods such as screen printing or a transfer method. After stacking a plurality of layers of dielectric green sheets on which internal electrode patterns are formed, a dielectric green sheet stack is obtained by pressing in the stacking direction. At this time, the dielectric green sheets and internal electrode patterns may be stacked so that the dielectric green sheets may be disposed on the upper and lower surfaces of the dielectric green sheet stack in the stacking direction.

Optionally, the obtained dielectric green sheet stack may be cut into predetermined dimensions by dicing or the like.

In addition, the dielectric green sheet stack may be solidified and dried to remove the plasticizer, etc. and barrel-polished by using a centrifugal barrel machine or the like after the solidification-drying. In the barrel polishing, the dielectric green sheet stack is put with a medium and a polishing liquid into a barrel container, and then the barrel container is applied with rotational motion or vibration to polish unnecessary parts such as burrs and the like generated during the cutting. In addition, after the barrel polishing, the dielectric green sheet stack is washed with a cleaning solution such as water and the like and dried.

The dielectric green sheet stack may be treated to remove the binder and fired, obtaining the capacitor body.

The binder removal may be performed under conditions appropriately adjusted according to a main component composition of the dielectric layer or a main component composition of the internal electrode. For example, the binder removal may be performed by increasing a temperature at about 5° C./hr to about 300° C./hr and maintaining about 180° C. to about 400° C. for about 0.5 hours to about 24 hours. The binder removal may be performed under an air atmosphere or a reducing atmosphere.

The firing treatment may be performed under conditions appropriately adjusted according to the main component composition of the dielectric layer or the main component composition of the internal electrode. For example, the firing may be performed at about 1000° C. to about 1350° C. or about 1100° C. to about 1300° C. for about 0.5 hours to about 8 hours or about 1 hour to about 3 hours. The firing may be performed under a reducing atmosphere, for example, an atmosphere in which a mixed gas of nitrogen gas ($N_2$) and hydrogen gas ($H_2$) is humidified. When the internal electrode includes nickel (Ni) or a nickel (Ni) alloy, an oxygen partial pressure may be about $1.0 \times 10^{-14}$ MPa to about $1.0 \times 10^{-10}$ MPa under the firing atmosphere.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the main component composition and the like of the dielectric layer. For example, the annealing may be performed at about 950° C. to about 1150° C. for about 0 hour to about 20 hours by increasing the temperature at about 50° C./hour to about 500° C./hour. The annealing may be performed under a humid nitrogen gas ($N_2$) atmosphere, wherein an oxygen partial pressure may be about $1.0 \times 10^{-9}$ MPa to about $1.0 \times 10^{-5}$ MPa.

In the binder removal treatment, the firing treatment, or the annealing treatment, in order to humidify nitrogen gas, mixed gas, or the like, a wetter or the like may be for example, used, wherein a water temperature may be about 5° C. to about 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the first and second internal electrodes on the outer surfaces of the third and fourth surfaces, thereby improving the electrical connection of the first and second external electrodes and the first and second internal electrodes and easily forming an alloy portion.

On the outer surface of the obtained capacitor body, a paste for forming a sintered metal layer is coated and sintered to form a sintered metal layer.

The paste for forming the sintered metal layer may include a conductive metal and glass. The conductive metal and the glass are the same as described above and will not be repeated illustrated again. In addition, the paste for forming the sintered metal layer may optionally include a subcomponent such as a binder, a solvent, a dispersant, a plasticizer, or oxide powder. For example, the binder may include ethyl cellulose, acryl, butyral, or the like, and the solvent may use an organic solvent such as terpineol, butyl carbitol, alcohol, methylethylketone, acetone, or toluene, or an aqueous solvent.

A method of coating the paste for forming the sintered metal layer on the outer surface of the capacitor body may include various printing methods such as a dip method, or screen printing, and the like, a coating method by using a dispenser, a spray method by using a spray, and the like. The paste for the sintered metal layer may be coated on at least the third and fourth surfaces of the capacitor body, and optionally, on a portion of the first surface, the second surface, the fifth surface, or the sixth surface where the band portions of the first and second external electrodes are formed Subsequently, the capacitor body on which the paste for forming the sintered metal layer is coated is dried and then sintered at a temperature of about 700° C. to about 1000° C. for about 0.1 hour to about 3 hours to form a sintered metal layer.

On the outer surface of the obtained capacitor body, a paste for forming a conductive resin layer is coated and cured to form a conductive resin layer.

The paste for forming the conductive resin layer may include a resin, and optionally a conductive metal or a non-conductive filler. The conductive metal and resin are the same as described above and will not be repeated illustrated again. In addition, the paste for forming the conductive resin layer may optionally include a subcomponent such as a binder, a solvent, a dispersant, a plasticizer, or an oxide powder. For example, the binder may include ethyl cellulose, acryl, butyral, or the like, and the solvent may include an organic solvent such as terpineol, butyl carbitol, alcohol, methylethylketone, acetone, or toluene, and the like or an aqueous solvent.

For example, a method of forming the conductive resin layer may include dipping the capacitor body 110 into the paste for forming the conductive resin layer to form the conductive resin layer and curing it, screen-printing or gravure-printing the paste for forming the conductive resin layer on the surface of the capacitor body 110, or coating the paste for forming the conductive resin layer on the surface of the capacitor body 110 and then curing it.

Next, a plating layer is formed outside the conductive resin layer. For example, the plating layer may be formed by a plating method, or may be formed by sputtering or electroplating (electric deposition).

Hereinafter, specific embodiments of the invention are presented. However, the examples described below are only for specifically illustrating or explaining the invention, and the scope of the invention is not limited thereto.

The ceramic powder may include $BaTiO_3$ powder. A liquid metal oxide additive was prepared by adding 0.1 to 1.0 parts by mole of $Dy_2O_3$, 0.1 to 1.0 parts by mole of $Tb_2O_3$, 0 to 0.2 parts by mole of $MnO_2$, 0 to 0.15 parts by mole of $V_2O_5$, 1.5 to 3.3 parts by mole of $BaCO_3$, 0.5 to 4.0 parts by mole of $SiO_2$, 0.4 to 0.6 parts by mole of $Al_2O_3$, and 0 to 0.8 parts by mole of $CaCO_3$ based on 100 parts by weight of the ceramic powder to a distilled water solvent and then mixing them, and filtering and drying the mixture.

The liquid metal oxide additive was mixed with the ceramic powder in a distilled water solvent and then mechanically milled, preparing a dielectric paste. Herein, 5 parts by mole of the liquid metal oxide additive was used based on 100 parts by mole of the ceramic powder (Comparative Example 1). Regarding the content of the liquid metal oxide additive in Comparative Example 1 as a reference of 100 mol %, the content of the liquid metal oxide additive was respectively reduced to 88.6 mol % (Example 1), 75 mol % (Example 2), and 62.5 mol % (Example 3), preparing each dielectric paste. Herein, the metal oxide additives are controlled to have the same composition.

The prepared dielectric paste was processed through a head discharge-type on-roll molding coater, manufacturing a dielectric green sheet. A conductive paste layer including nickel (Ni) was printed on the surface of the dielectric green sheet, and then the dielectric green sheets (width×length×height=3.2 mm×2.5 mm×2.5 mm) with the conductive paste layer was stacked and compressed, manufacturing a dielectric green sheet stack. The dielectric green sheet stack was calcined at less than or equal to 400° C. under a nitrogen atmosphere and sintered at 1180° C. under a hydrogen concentration of 1.0% or less, manufacturing a multilayered capacitor.

The multilayered capacitors according to Comparative Example 1 and Examples 1 to 3 were polished to a depth of ½ in the width direction to expose an LT cross-section and then to take a photograph of three dielectric green sheet layers of an active center in an active region with a scanning electron microscope (SEM), from which dielectric grains are analyzed. SEM was set at an accelerating voltage of 2.0 KV and WD of 3.2 mm.

Figure 5:
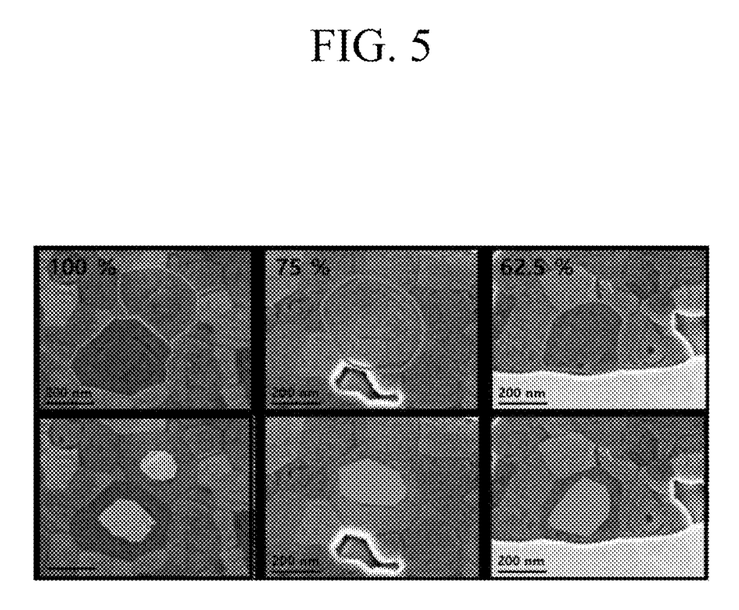
FIG. 5 shows scanning electron microscope (SEM) images of core-shell dielectric grains of Comparative Example 1, Example 2, and Example 3, from left to right, wherein the top row shows rims of the grains and the bottom row shows the core portions.

FIG. 5 is a 70K magnification SEM image of the dielectric grains of Comparative Example 1 and Examples 2 and 3, wherein the upper images exhibit a boundary of each grain, and the lower images exhibit each core therein. Referring to FIG. 5, the SEM images show that core portions inside the grains are clearly distinguished, and as the content of the additive is reduced, the shell ratio decreases, but the core ratio increases. When the content of the additive was reduced, since the elements of the additive were decreasingly diffused from the surface of the ceramic powder to the inside, the shell ratio decreases, thereby increasing the core fraction. When a conventional oxide additive was used, since polydispersity of the additive is much reduced, the additive is partially agglomerated, making it difficult to realize intended characteristics of a capacitor. On the contrary, when a liquid additive with higher uniformity than the conventional additive was used by reducing a content of the liquid additive, the shell ratio may be reduced, while still keeping a uniform thickness of the shell.

Figure 6:
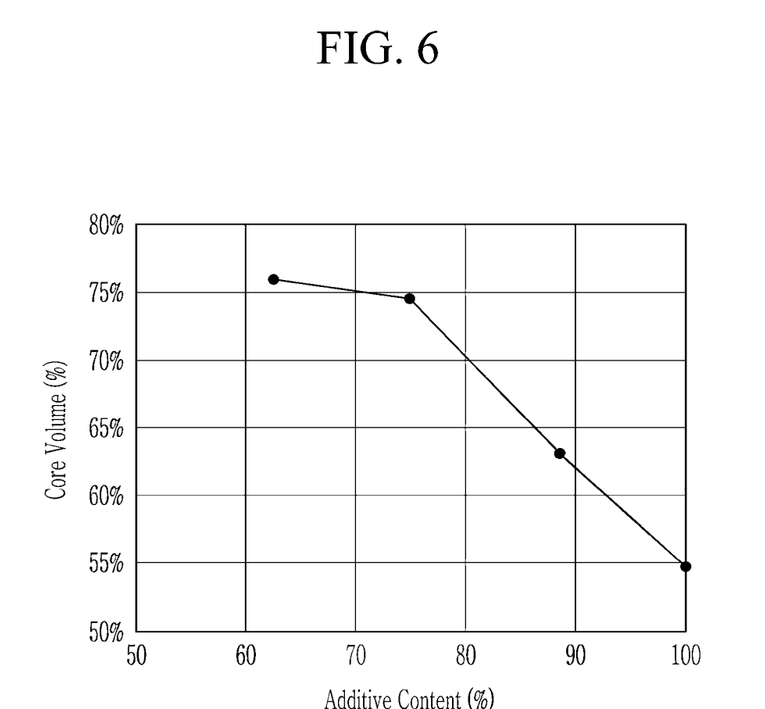
FIG. 6 is a graph showing the core fraction as a function of the content of the liquid metal oxide additive.

In the 70K magnification SEM images of Comparative Example 1 and Examples 1 to 3, diameters of 50 dielectric grains and cores thereof were measured and calculated into each arithmetic average, and the results are shown in Table 1 and FIG. 6. The diameters were calculated as an average of a length of a major axis (Max Feret diameter) and a length of a minor axis (Orthogonal Feret diameter).

TABLE 1

| | Content of additive (wt %) | $D_{grain}$ (nm) | $D_{core}$ (nm) | Core length fraction ($D_{core}/D_{grain}$) |
|---|---|---|---|---|
| Comparative Example 1 | 100 | 391.45 | 214.28 | 54.7% |
| Example 1 | 88.6 | 438.26 | 276.36 | 63.1% |
| Example 2 | 75 | 423.66 | 315.56 | 74.5% |
| Example 3 | 62.5 | 398.79 | 302.91 | 76.0% |

Referring to Table 1 and FIG. 6, when the content of the additive was reduced to 62.5%, the core fraction increased from 55% to 76%.

Subsequently, the multilayered capacitors according to Comparative Example 1 and Examples 1 to 3 were evaluated with respect to a dielectric constant and DC-bias characteristics, and the results are shown in Table 2. In addition, the multilayered capacitors according to Comparative Example 1 and Example 2 were measured with respect to a change in a dielectric constant according to a temperature, and the results are shown in Table 3.

TABLE 2

| | Core length fraction ($D_{core}/D_{grain}$) | Dielectric constant | DC @14 V |
|---|---|---|---|
| Comparative Example 1 | 54.7% | 2016 | −72.1% |
| Example 1 | 63.1% | 2094 | −71.3% |
| Example 2 | 74.5% | 2143 | −70.5% |
| Example 3 | 76.0% | 2219 | −68.7% |

TABLE 3

| | Content of additive (wt %) | 25° C. | −55° C. | 25° C. | 85° C. | 105° C. | 125° C. |
|---|---|---|---|---|---|---|---|
| Comparative Example 1 | 100 | 1.30% | −23.01% | 0.00% | 6.50% | −6.06% | −21.39% |
| Example 2 | 75 | 1.88% | −21.52% | 0.00% | 7.32% | −2.02% | −16.30% |

Referring to Tables 2 and 3, the examples of increasing a core fraction exhibited an increase in the dielectric constant, a decrease in dielectric constant reduction rate when a DC voltage is applied thereto, and improved dielectric characteristics (TCC) according to a temperature, compared with the comparative example.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

Description of Symbols

100: multilayered capacitor
110: capacitor body
111: dielectric layer
1111: dielectric grain having core-shell structure
1111a: core of dielectric grain
1111b: shell of dielectric grain
112, 113: cover region
121: first internal electrode
122: second internal electrode
131: first external electrode
132: second external electrode

What is claimed is:

1. A multilayered capacitor, comprising
a capacitor body including a dielectric layer and an internal electrode, and
an external electrode disposed on outer surface the capacitor body,
wherein the dielectric layer includes a plurality of dielectric grains,
at least one of the plurality of dielectric grains has a core-shell structure,
a ratio of a diameter of a core of the core-shell structure to a diameter of the at least one of the plurality of dielectric grains having the core-shell structure is about 60% to about 80%,
at least one of the plurality of dielectric grains comprises: a main component including a barium titanate-based compound; and a subcomponent including dysprosium (Dy),
in the dielectric grains of the core-shell structure, an amount of the subcomponent included in the shell is more than an amount of the subcomponent included in the core, and
in the dielectric grains of the core-shell structure, the shell of the core-shell structure includes the subcomponent in an amount of greater than about 0.1 moles and less than or equal to about 30 moles relative to 100 moles of the main component.

2. The multilayered capacitor of claim 1, wherein the ratio is about 60% to about 76%.

3. The multilayered capacitor of claim 1, wherein the ratio is about 70% to about 80%.

4. The multilayered capacitor of claim 1, wherein the ratio is about 74.5% to about 80%.

5. The multilayered capacitor of claim 1, wherein in the dielectric grains of the core-shell structure, the diameter of the at least one of the plurality of dielectric grains having the core-shell structure is about 300 nm to about 500 nm and the diameter of the core of the core-shell structure is about 200 nm to about 400 nm.

6. The multilayered capacitor of claim 1, wherein a standard deviation of an average thickness of a shell of the core-shell structure is less than or equal to about 10% relative to the diameter of the dielectric grains of the core-shell structure.

7. The multilayered capacitor of claim 1, wherein
the subcomponent further includes at least one of manganese (Mn), chromium (Cr), silicon (Si), aluminum (Al), magnesium (Mg), tin (Sn), antimony (Sb), germanium (Ge), gallium (Ga), indium (In), or a combination thereof.

8. The multilayered capacitor of claim 1, wherein
in the dielectric grains of the core-shell structure,
the core includes the subcomponent in an amount of less than or equal to about 0.1 moles relative to 100 moles of the main component.

9. The multilayered capacitor of claim 1, wherein
the main component includes $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, or a combination thereof.

10. The multilayered capacitor of claim 1, wherein
the main component includes $Ba_mTiO_3$ ($0.995 \leq m \leq 1.01$), $(Ba_{1-x}Ca_x)_m(Ti_{1-y}Zr_y)O_3$ ($0.995 \leq m \leq 1.01$, $0 \leq x \leq 0.1$, $0 < y \leq 0.2$), $Ba_m(Ti_{1-x}Zr_x)O_3$ ($0.995 \leq m \leq 1.01$, $0 \leq x \leq 0.1$), $(Ba_{1-x}Ca_x)_m(Ti_{1-y}Sn_y)O_3$ ($0.995 \leq m \leq 1.010$, $0 \leq x \leq 0.1$, $0 < y \leq 0.2$), or a combination thereof.

11. The multilayered capacitor of claim 1, wherein
the subcomponent further includes lanthanum (La), yttrium (Y), actinide (Ac), cerium (Ce), praseodymium (Pr), neodymium (Nd), promethium (Pm), samarium (Sm), europium (Eu), gadolinium (Gd), terbium (Tb), holmium (Ho), erbium (Er), thulium (Tm), ytterbium (Yb), lutetium (Lu), hafnium (Hf), vanadium (V), or a combination thereof.

12. The multilayered capacitor of claim 1, wherein
the subcomponent include at least one of about 0.1 parts by mole to about 1.0 part by mole of $Dy_2O_3$, about 0.1 parts by mole to about 1.0 part by mole of $Tb_2O_3$, about 0 parts by mole to about 0.2 parts by mole of $MnO_2$, about 0 parts by mole to about 0.15 parts by mole of $V_2O_5$, about 1.5 parts by mole to about 3.3 parts by mole of $BaCO_3$, about 0.5 parts by mole to about 4.0 parts by mole of $SiO_2$, about 0.4 parts by mole to about 0.6 parts by mole of $Al_2O_3$, or about 0 parts by mole to about 0.8 parts by mole of $CaCO_3$ relative to 100 parts by mole of the main component.

13. The multilayered capacitor of claim 1, wherein an average thickness of the dielectric layer is about 0.2 μm to about 10 μm.

14. A method of manufacturing the multilayered capacitor according to claim 1, comprising
mixing a ceramic powder and a liquid metal oxide additive to prepare a dielectric paste including dielectric grains having a core-shell structure,
preparing a dielectric green sheet including the dielectric paste,
forming a conductive paste layer on a surface of the dielectric green sheet,
stacking the dielectric green sheet with the conductive paste layer to prepare a dielectric green sheet stack,
firing the dielectric green sheet stack to prepare a capacitor body, and
forming an external electrode on a first surface of the capacitor body,
wherein in the mixing the ceramic powder and the liquid metal oxide additive, the liquid metal oxide additive is added in an amount of about 0.05 parts by mole to about 4.5 parts by mole based on 100 parts by mole of the ceramic powder.

15. The method of claim 14, wherein
in the dielectric grains having the core-shell structure, a ratio a diameter of a core of the core-shell structure to a diameter of the dielectric grains is about 60% to about 80%.

16. The method of claim 14, wherein
the liquid metal oxide additive includes an acidic solvent and an ionic metal oxide, and optionally an ionic surfactant.

17. The method of claim 14, wherein
the liquid metal oxide additive includes an acidic solvent, an ionic metal oxide, and an ionic surfactant.

18. The method of claim 14, wherein
the ceramic powder includes barium titanite, and
the metal oxide includes manganese (Mn), chromium (Cr), silicon (Si), aluminum (Al), magnesium (Mg), tin (Sn), antimony (Sb), germanium (Ge), gallium (Ga), indium (In), or a combination thereof.

19. The method of claim 18, wherein
the ceramic powder includes $Ba_mTiO_3$ ($0.995 \leq m \leq 1.010$), $(Ba_{1-x}Ca_x)_m(Ti_{1-y}Zr_y)O_3$ ($0.995 \leq m \leq 1.01$, $0 \leq x \leq 0.1$, $0 < y \leq 0.2$), $Ba_m(Ti_{1-x}Zr_x)O_3$ ($0.995 \leq m \leq 1.01$, $0 \leq x \leq 0.1$), $(Ba_{1-x}Ca_x)_m(Ti_{1-y}Sn_y)O_3$ ($0.995 \leq m \leq 1.01$, $0 \leq x < 0.1$, $0 < y \leq 0.2$), or a combination thereof.

20. The method of claim 18, wherein
the metal oxide further includes lanthanum (La), yttrium (Y), actinide (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V), or a combination thereof.

* * * * *